United States Patent
Dambrine et al.

(10) Patent No.: US 9,597,841 B2
(45) Date of Patent: Mar. 21, 2017

(54) FIBROUS STRUCTURE HAVING VARIABLE NUMBERING YARNS

(71) Applicant: SNECMA, Paris (FR)

(72) Inventors: Bruno Jacques Gerard Dambrine, Le Chatelet en Brie (FR); Dominique Coupe, Le Haillan (FR); Jonathan Goering, York, ME (US); Brock Gilbertson, Dover, NH (US); Jean-Noel Mahieu, Paris (FR)

(73) Assignee: SNECMA, Paris (FR)

( * ) Notice: Subject to any disclaimer, the term of this patent is extended or adjusted under 35 U.S.C. 154(b) by 468 days.

(21) Appl. No.: 14/364,996

(22) PCT Filed: Dec. 10, 2012

(86) PCT No.: PCT/FR2012/052852
§ 371 (c)(1),
(2) Date: Jun. 12, 2014

(87) PCT Pub. No.: WO2013/088039
PCT Pub. Date: Jun. 20, 2013

(65) Prior Publication Data
US 2014/0369847 A1 Dec. 18, 2014

Related U.S. Application Data

(60) Provisional application No. 61/570,386, filed on Dec. 14, 2011.

(51) Int. Cl.
*F01D 5/14* (2006.01)
*D03D 25/00* (2006.01)
(Continued)

(52) U.S. Cl.
CPC ............ *B29C 70/22* (2013.01); *B29C 70/24* (2013.01); *D03D 25/005* (2013.01);
(Continued)

(58) Field of Classification Search
CPC ...... B29C 70/22; B29C 70/24; D03D 41/004; D03D 25/005; F01D 5/147; F01D 5/282;
(Continued)

(56) References Cited

U.S. PATENT DOCUMENTS 7,943,535 B2 * 5/2011 Goering ............... B29C 70/222
139/1 R
2005/0084377 A1 4/2005 Dambrine et al.
(Continued)

FOREIGN PATENT DOCUMENTS

EP 1 526 285 A1 4/2005
JP 9-157993 6/1997
(Continued)

OTHER PUBLICATIONS

International Search Report issued Nov. 20, 2013, in PCT/FR12/052852 filed Dec. 10, 2012.

*Primary Examiner* — Richard Edgar
(74) *Attorney, Agent, or Firm* — Oblon, McClelland, Maier & Neustadt, L.L.P.

(57) ABSTRACT

A fiber structure for reinforcing a composite material part, the structure being woven as a single piece by multilayer weaving between a first plurality of layers of yarns extending in a first direction and a second plurality of layers of yarns extending in a second direction. The second plurality of layers of yarns includes at least one layer of variable-weight yarns, each variable-weight yarn including a separable assembly of individual yarns, each having a determined weight. The fiber structure includes at least one portion of reduced thickness in which the variable-weight yarn presents a weight that is less than the weight that it presents prior to the reduced thickness portion.

13 Claims, 4 Drawing Sheets (51) Int. Cl.
  *B29C 70/22* (2006.01)
  *B29C 70/24* (2006.01)
  *F01D 5/28* (2006.01)
  *D03D 41/00* (2006.01)
  *B29L 31/08* (2006.01)

(52) U.S. Cl.
  CPC ............ *D03D 41/004* (2013.01); *F01D 5/147* (2013.01); *F01D 5/282* (2013.01); *B29L 2031/08* (2013.01); *Y02T 50/672* (2013.01); *Y10T 428/24603* (2015.01)

(58) Field of Classification Search
  CPC ......... Y10T 428/24603; B29L 2031/08; Y02T 50/672
  See application file for complete search history.

(56) References Cited

U.S. PATENT DOCUMENTS

| | | |
|---|---|---|
| 2006/0257260 A1 | 11/2006 | Dambrine et al. |
| 2011/0176927 A1 | 7/2011 | Alexander et al. |

FOREIGN PATENT DOCUMENTS

| | | |
|---|---|---|
| JP | 9-157993 A | 6/1997 |
| JP | 2009-516091 A | 4/2009 |
| JP | 2011-503377 A | 1/2011 |

\* cited by examiner

FIBROUS STRUCTURE HAVING VARIABLE NUMBERING YARNS

BACKGROUND OF THE INVENTION

The present invention relates to making parts out of composite material, and more particularly to making reinforcing fiber structures for such parts.

A particular field of application of the invention lies in making parts of structural composite material, i.e. parts having a fiber reinforcing structure that is densified by a matrix. Composite materials make it possible to fabricate parts that present overall weight that is less than that of the same parts when made of metal.

In the context of making fiber structures by multilayer weaving so as to produce the fiber reinforcement for a composite material part, such as a blade for an aeroengine, it is necessary during weaving of the structure to withdraw yarns both in the warp direction and in the weft direction in order to match reductions in the thickness of the part, e.g. in the fastening or in the trailing edge of the blade, so as to obtain a fiber preform that presents the quasi-final shape and dimensions of the blade (i.e. that presents its "net shape").

In the portions of the fiber structure that have a large number of layers of yarns, withdrawing yarns has little influence on varying the density of the fibers, which density remains relatively constant. Nevertheless, once the number of layers decreases significantly, e.g. when there remain only four or fewer layers of weft yarns or of warp yarns, then the variation in fiber density becomes too great when another layer of yarns is withdrawn.

OBJECT AND SUMMARY OF THE INVENTION

It is therefore desirable to be able to have fiber structures available with the quasi-final shape and dimensions of the composite material part that is to be made, in particular in portions thereof that are of decreasing thickness, while having fiber density varying minimally in such portions.

To this end, the invention provides a fiber structure for reinforcing a composite material part, said structure being woven as a single piece by multilayer weaving between a first plurality of layers of yarns extending in a first direction and a second plurality of layers of yarns extending in a second direction, the structure being characterized in that at least one of the first and second pluralities of layers of yarns includes at least one layer of yarns of variable weight, each variable-weight yarn being made up of a separable assembly of individual yarns each having a determined weight; and in that the fiber structure includes at least one portion of reduced thickness in which the variable-weight yarns present weight that is less than the weight presented by said variable-weight yarns prior to said portion of reduced thickness.

By using yarns of variable weight, it is possible to adjust the weight of the yarns as a function of the decrease in the number of layers of yarns in portions of the structure that are of small thickness, thereby controlling variation in fiber density so that such variation is minimized. The unit yarns making up the yarns of variable weight may be extracted progressively from the fiber structure, thus making it possible to avoid any sudden variation in the fiber density, in particular in portions of small thickness that include a small number of layers of yarns.

In a particular aspect of the invention, the weight of each individual yarn of a variable-weight yarn is a divisor of the weight of said variable-weight yarn.

In another aspect of the invention, the variable-weight yarns are selected from at least one of the following types of yarn: twisted yarns, plied yarns, and covered yarns.

In yet another aspect of the invention, each variable-weight yarn has an initial weight of 48K, and it is made up of one of the following separable assemblies of individual yarns:

two individual yarns, each weighing 24K;
three individual yarns comprising one weighing 24K and two others, each weighing 12K; and
four yarns, each weighing 12K.

According to a particular characteristic of the invention, in the portion of reduced thickness, the fiber structure has three layers of the first plurality of layers of yarns and two layers of the second plurality of layers of yarns.

According to another particular characteristic of the invention, the portion of reduced thickness includes at least one zone starting from which a layer of the first or second plurality of layers of yarns is interrupted, said interrupted layer of yarns being replaced thereafter in the portion of reduced thickness by individual yarns of a layer of variable-weight yarns adjacent to said interrupted layer.

The invention also provides a composite material part comprising a fiber structure of the invention densified by a matrix. In particular, the part may constitute an aeroengine blade.

The invention also provides a turboprop fitted with a plurality of blades of the invention.

The invention also provides an aircraft fitted with at least one turboprop of the invention.

BRIEF DESCRIPTION OF THE DRAWINGS

Other characteristics and advantages of the invention appear from the following description of particular embodiments of the invention given as non-limiting examples and with reference to the accompanying drawings, in which.

DETAILED DESCRIPTION OF EMBODIMENTS

The invention applies in general to making fiber structure suitable for constituting fiber reinforcement, referred to as preforms, for use in fabricating composite material parts, in particular aeroengine blades, the parts being obtained by densifying fiber structures with a matrix. Typically, the matrix is made of a resin, for composite materials that are used up to temperatures that are relatively low, typically up to 300° C., or by a refractory material such as carbon or ceramic for thermostructural composite materials.

Figure 1:
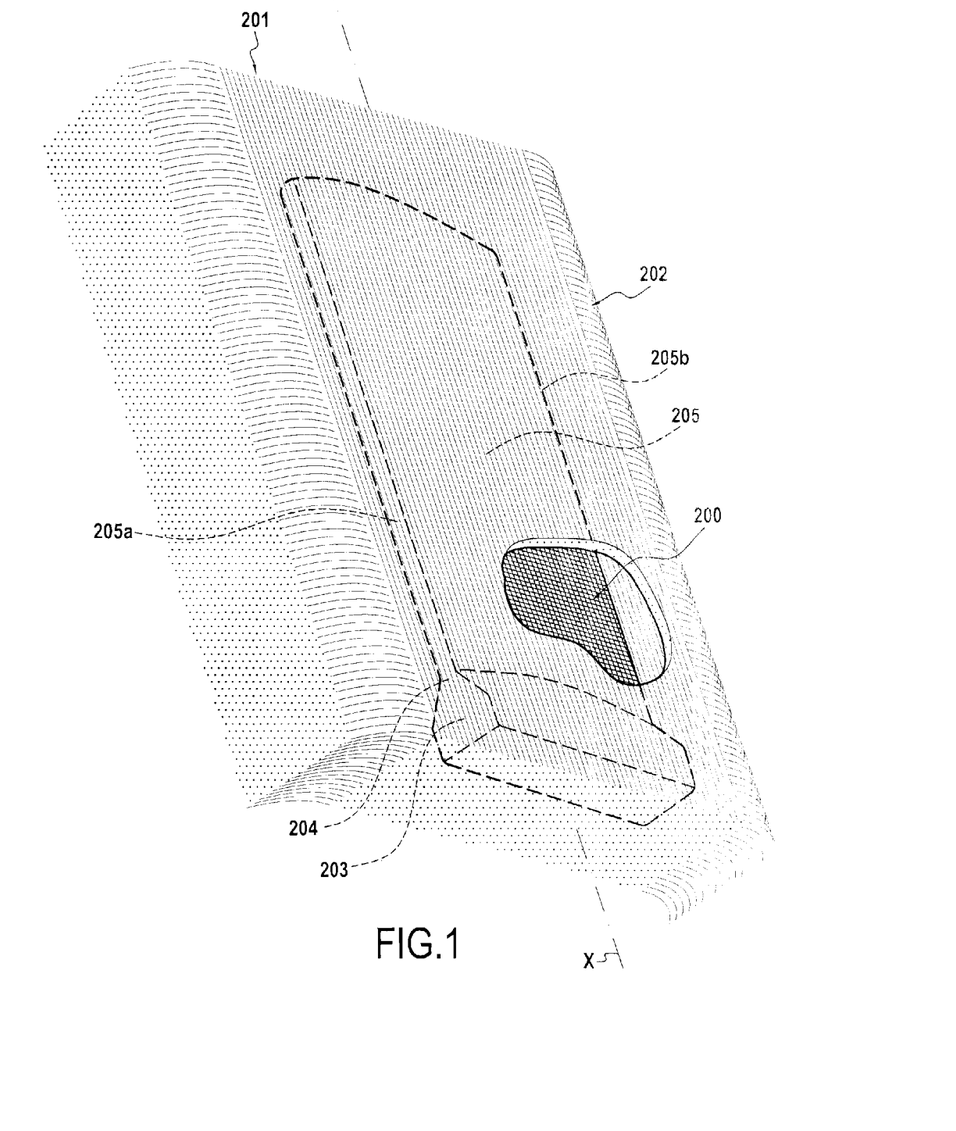
FIG. 1 is a diagrammatic view showing multilayer weaving of a fiber structure for fabricating an aeroengine blade in an embodiment of the invention.

FIG. 1 is a highly diagrammatic view of a fiber structure 200 for forming the fiber reinforcement of an aeroengine blade.

The fiber structure 200 is obtained by multilayer weaving performed in known manner using a jacquard type loom having a bundle of warp yarns or strands 201 organized as a plurality of layers, the warp yarns being interlinked by weft yarns 202 likewise arranged as a plurality of layers.

The fiber structure 200 is woven in the form of a strip extending generally in a direction X corresponding to the longitudinal direction of the blade that is to be made. The fiber structure presents thickness that varies in a manner that is determined as a function of the longitudinal thickness of the airfoil profile of the blade that is to be made. In its portion that is to form a root preform, the fiber structure 200 presents extra thickness 203 determined as a function of the thickness of the root of the blade that is to be made and that may be implemented, for example, by using yarns of greater weight or by using an insert. The fiber structure 200 is extended by a portion of decreasing thickness 204 that is to form the tang of the blade followed by a portion 205 that is to form the airfoil of the blade. In a direction perpendicular to the direction X, the portion 205 presents a profile of thickness that varies between its edge 205a that is to form the leading edge of the blade and its edge 205b that is to form the trailing edge of the blade that is to be made.

Examples of making a fiber preform for forming the fiber reinforcement of an aeroengine blade are described in particular in detail in the following documents: U.S. Pat. No. 7,101,154, U.S. Pat. No. 7,241,112, and WO 2010/061140, the contents of which is incorporated herein by reference.

In the examples described below, the outer faces, or "skins", of the fiber structure are made using a satin type weave, while the internal portion of the structure is made using an interlock type weave, as described in document WO 2006/136755, the content of which is incorporated herein by reference. The term "interlock" is used herein to mean a weave in which each layer of warp yarns interlocks a plurality of layers of weft yarns with all of the yarns in a given warp column having the same movement in the weave plane.

The fiber structure of the invention may in particular, but not exclusively, be woven using fibers made of carbon or of ceramic such as silicon carbide. The fiber density in the fiber structure is determined locally as a function of the density of yarns present at the location of the structure under consideration.

The fiber structure 200 is woven as a single piece and after the non-woven yarns have been cut it is to present the quasi-final shape and dimensions of the blade (i.e. the "net shape"). For this purpose, in the portions of the fiber structure in which thickness is reduced, such as the portion situated between the edges 205a and 205b of the structure, the thickness of the preform is reduced by progressively withdrawing layers of warp yarns and of weft yarns during weaving.

In accordance with the invention, the fiber structure is woven with yarns including at least some that are so-called yarns of "variable weight", i.e. yarns that are made up of a separable assembly of individual yarns, each having a determined weight, with the sum of the weights of all of the individual yarns making up a variable-weight yarn giving its initial weight.

The weight of a yarn corresponds to its size (and depending on the type of material constituting the yarn its density will vary so the volume it occupies for a given weight will be different), and it may be defined in various ways. In particular, it may be defined as the weight per unit length of the yarn, which is generally expressed in tex, corresponding to the weight in grams of 1000 meters of yarn, or in decitex (dtex) corresponding to the weight (in grams) of 10,000 meters of yarn. The weight of the yarn may also be defined as the number of filaments that make it up. Under such circumstances, the weight of the yarn is expressed in "K" which corresponds to the number of thousands of filaments per yarn. For example a 1K yarn has 1000 filaments. Other units of measurement may also be used to give the weight of a yarn, such as, for example, its metric number (Nm) expressing the number of meters represented by one gram of a yarn.

In the present invention, the individual yarns making up a yarn of variable weight may be assembled together in various ways. In particular, the variable-weight yarn may be an assembled yarn that results from uniting a plurality of individual yarns without significant twisting.

Variable-weight yarns are advantageously reduced in weight when reducing the thickness of the fiber structure by withdrawing a layer of yarns in order to minimize the variation in the fiber density in these portions of reduced thickness. It is preferable to reduce the weight of variable-weight yarns when the fiber structure is down to four layers (weft or warp) or even fewer. This reduction may be applied equally well to warp yarns, to weft yarns, or both to warp and to weft yarns. The location in the fiber texture from which the weight of a variable-weight yarn is reduced is independent from the location at which a layer of yarn (warp or weft) is withdrawn in order to narrow down the structure.

As explained below, variable-weight yarns may be used for implementing a progressive exit from the fiber structure for the yarns in a layer of yarns. Variable-weight yarns may also be used to replace yarns of an adjacent layer that has been extracted completely from the fiber structure, with some of the individual yarns of the variable-weight yarn being conserved in the layer to which they belonged initially in order to continue weaving that layer while the other individual yarns are deflected to continue weaving the extracted adjacent layer of the structure.

Example embodiments of a fiber structure for constituting reinforcement in a composite material blade in accordance with the invention are described below. In all of these examples, the weaving is performed on a jacquard type loom.

Example 1

FIGS. 2A to 2H show eight successive weave planes of a portion of a fiber structure S1 obtained by multilayer weaving, the weft yarns being shown in section. The portion of the fiber structure S1 shown corresponds to the portion of the fiber reinforcement that is situated at the trailing edge of the composite material blade, such as the portion 205b of the fiber structure 200 in FIG. 1. The eight weave planes shown in FIGS. 2A to 2H correspond to eight successive stages of variation in the weave of the structure S1. These eight planes do not fully define the weave of the structure S1.

In FIGS. 2A to 2E, the fiber structure has three layers of weft yarns $t_{10}$, $t_{20}$, and $t_{30}$. In FIG. 2F, a half-layer of the layer $t_{20}$ is withdrawn so as to leave only the half-layer $t'_{20}$ in the structure S1. In FIG. 2G to 2H, the half-layer $t'_{20}$ is withdrawn so as to leave only the two layers $t_{20}$ and $t_{30}$ in the structure S1.

In the planes shown in FIGS. 2A to 2H, the yarns or half-layers of weft yarns are woven with three warp yarns 10, 20, and 30, the warp yarns 10 and 30 being woven with a satin type weave and the warp yarn 20 being woven with an interlock type weave. The warp yarns 20 and 30 are yarns having a weight of 48K while the ware yarn 10 is a variable-weight yarn made up of a separable assembly of two individual yarns 11 and 12, each having a weight of 24K.

Figure 2:
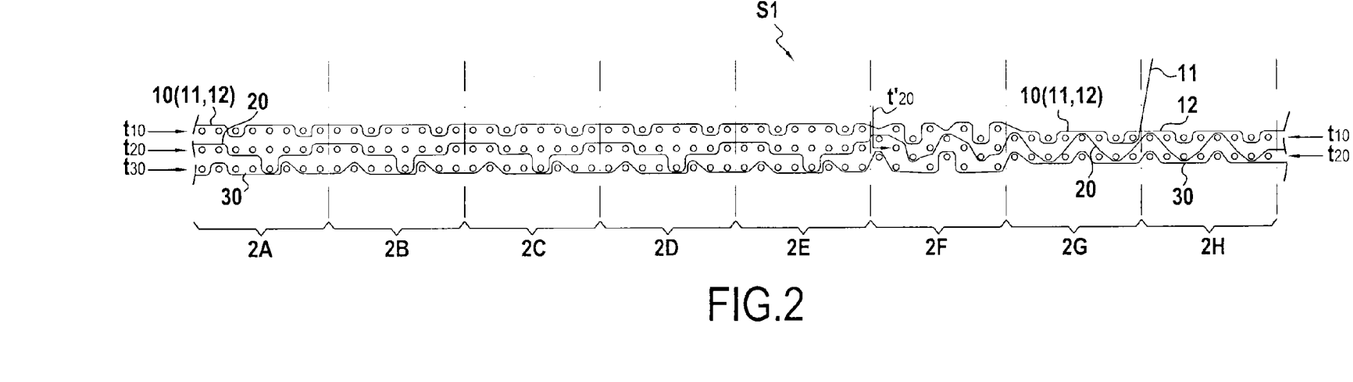
FIGS. 2A to 2H show eight successive weave planes in weft section of a portion of the FIG. 1 fiber structure that is to form the trailing edge of the blade that is to be made in an embodiment of the invention.

In FIG. 2G, the individual yarn 11 of the variable-weight yarn 10 is extracted from the structure S1, with weaving being continued with the other individual yarn 12 weighing 24K.

Example 2

FIGS. 3A to 3H show eight successive weave planes of a portion of a fiber structure S2 obtained by multilayer weaving, the weft yarns being shown in section. The portion of the fiber structure S2 shown corresponds to the portion of the fiber reinforcement that is situated at the trailing edge of the composite material blade, such as the portion 205b of the fiber structure 200 in FIG. 1. The eight weave planes shown in FIGS. 3A to 3H correspond to eight successive stages of variation in the weave of the structure S2. These eight planes do not fully define the weave of the structure S2.

In FIGS. 3A to 3D, the fiber structure has three layers of weft yarns $t_{40}$, $t_{50}$, and $t_{60}$. In FIG. 3E, a half-layer of the layer $t_{50}$ is withdrawn so as to leave only the half-layer $t'_{50}$ in the structure S2. In FIG. 3F to 3H, the half-layer $t'_{50}$ is withdrawn so as to leave only the two layers $t_{40}$ and $t_{60}$ in the structure S2.

In the planes shown in FIGS. 3A to 3H, the yarns or half-layers of weft yarns are woven with three warp yarns 40, 50, and 60, the warp yarns 40 and 60 being woven with a satin type weave and the warp yarn 50 being woven with an interlock type weave. The warp yarns 40 and 50 are variable-weight yarns, each comprising a respective separable assembly of two individual yarns 41 & 42 and 51 & 52, each individual yarn weighing 24K. The warp yarn 60 is a yarn weighing 48K.

Figure 3:
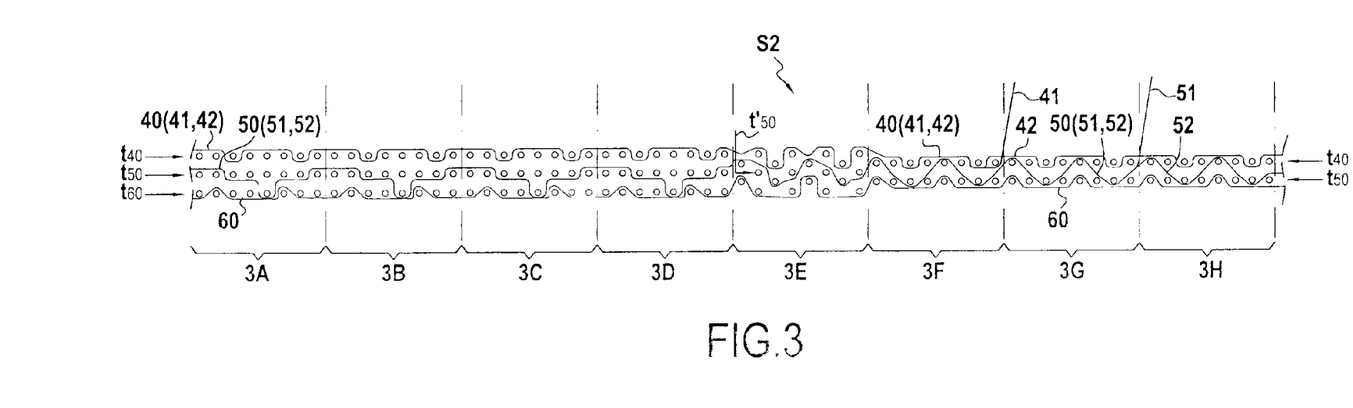
FIGS. 3A to 3H show eight successive weave planes in weft section of a portion of the FIG. 1 fiber structure that is to form the trailing edge of the blade that is to be made in another embodiment of the invention.

In FIG. 3F, the individual yarn 41 of the variable-weight yarn 40 is extracted from the structure S2, with weaving being continued with the other individual yarn 42 weighting 24K. In FIG. 3F, the individual yarn 41 of the variable-weight yarn 40 is extracted from the structure S2, with weaving being continued with the other individual yarn 42 weighting 24K. In FIG. 3G, the individual yarn 51 of the variable-weight yarn 50 is extracted from the structure S2, weaving being continued with the other individual yarn 52 weighing 24K.

Example 3

FIGS. 4A to 4H show eight successive weave planes of a portion of a fiber structure S3 obtained by multilayer weaving, the weft yarns being shown in section. The portion of the fiber structure S3 shown corresponds to the portion of the fiber reinforcement that is situated at the trailing edge of the composite material blade, such as the portion 205b of the fiber structure 200 in FIG. 1. The eight weave planes shown in FIGS. 4A to 4H correspond to eight successive stages of variation in the weave of the structure S3. These eight planes do not fully define the weave of the structure S3.

Figure 4:
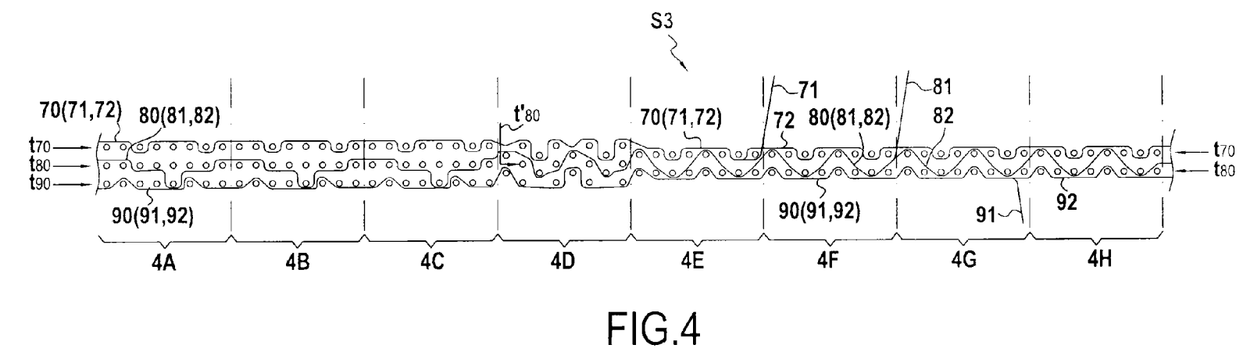
FIGS. 4A to 4H show eight successive weave planes in weft section of a portion of the FIG. 1 fiber structure that is to form the trailing edge of the blade that is to be made in another embodiment of the invention.

In FIGS. 4A to 4C, the fiber structure has three layers of weft yarns $t_{70}$, $t_{80}$, and $t_{90}$. In FIG. 4D, a half-layer of the layer $t_{80}$ is withdrawn so as to leave only the half-layer $t'_{80}$ in the structure S3. In FIGS. 43 to 4H, the half-layer $t'_{80}$ is withdrawn so as to leave only the two layers $t_{70}$ and $t_{90}$ in the structure S3.

In the planes shown in FIGS. 4A to 4H, the yarns or half-layers of weft yarns are woven with three warp yarns 70, 80, and 90, the warp yarns 70 and 90 being woven with a satin type weave and the warp yarn 80 being woven with an interlock type weave. The warp yarns 70, 80, and 90 are variable-weight yarns, each made up of a respective separable assembly of two individual yarns 71 & 72, 81 & 22, and 91 & 92, each individual yarn weighing 24K.

In FIG. 4E, the individual yarn 71 of the variable-weight yarn 70 is extracted from the structure S3, with weaving continuing with the other individual yarn 72 weighing 24K. In FIG. 4F, the individual yarn 81 of the variable-weight yarn 80 is extracted from the structure S3, with weaving continuing with the other individual yarn 82 weighing 24K. In FIG. 4G, the individual yarn 91 of the variable-weight yarn 90 is extracted from the structure S3, with weaving continuing with the other individual yarn 92 weighing 24K.

Example 4

Figure 5:
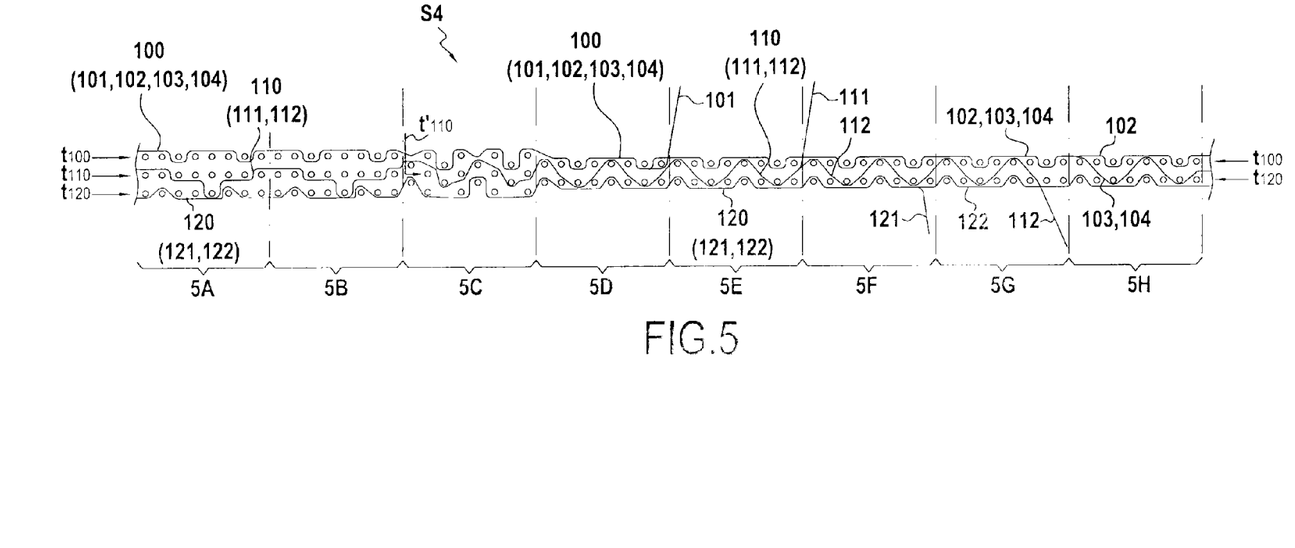
FIGS. 5A to 5H show eight successive weave planes in weft section of a portion of the FIG. 1 fiber structure that is to form the trailing edge of the blade that is to be made in another embodiment of the invention.

FIGS. 5A to 5H show eight successive weave planes in a portion of the fiber structure S4 obtained by multilayer weaving, the weft yarns being shown in section. The portion of the fiber structure S4 shown corresponds to the portion of the fiber reinforcement that is situated at the trailing edge of the composite material blade, like the portion 205b of the fiber structure 200 of FIG. 1. The eight weave planes shown in FIGS. 5A to 5H correspond to eight successive stages of variation in the weave of the structure 34. These eight planes do not fully define the weave of the structure S4. In FIGS. 5A and 5B, the fiber structure comprises three layers of weft yarns $t_{100}$, $t_{110}$, and $t_{120}$. In FIG. 5C, a half-layer of the layer $t_{110}$ is withdrawn so as to leave only the half-layer $t'_{110}$ in the structure S4. In FIGS. 5D to 5H, the half-layer $t'_{110}$ is withdrawn so as to leave only the two layers $t_{100}$ and $t_{120}$ in the structure S4.

In the planes shown in FIGS. 5A to 5F, the layers or half-layers of weft yarns are woven with three warp yarns 100, 110, 120, the warp yarns 100 and 120 being woven with a satin type weave and the warp yarn 110 being woven with an interlock type weave.

The warp yarn 100 is variable-weight yarn made up of a separable assembly of four individual yarns 101 to 104 each weighing 12K. The warp yarns 110 and 120 are variable-weight yarns each made up of a separable assembly of two individual yarns 111 & 112 or 121 & 122 respectively, each individual yarn weighing 24K.

In FIG. 5D, the individual yarn 101 of the variable-weight yarn 100 is extracted from the structure S4, with weaving continuing with the three remaining individual yarns 102, 103, and 104, each weighing 12K.

In FIG. 5E, the individual yarn 111 of the variable-weight yarn 110 is extracted from the structure S4, with weaving continuing with the other individual yarn 112 weighing 24K.

In FIG. 5F, the individual yarn 121 of the variable-weight yarn 120 is extracted from the structure S4, with weaving continuing with the other individual yarn 122 weighing 24K.

In FIG. 5G, the individual yarn 112 is extracted from the structure S4 such that there no longer remains any individual yarn derived from the variable-weight yarn 110. Weaving of the individual yarn 112 in the core is continued by the individual yarns 103 and 104, each weighing 12K, while weaving in the skin is continued by the individual yarn 102 weighing 12K.

Figure 6:
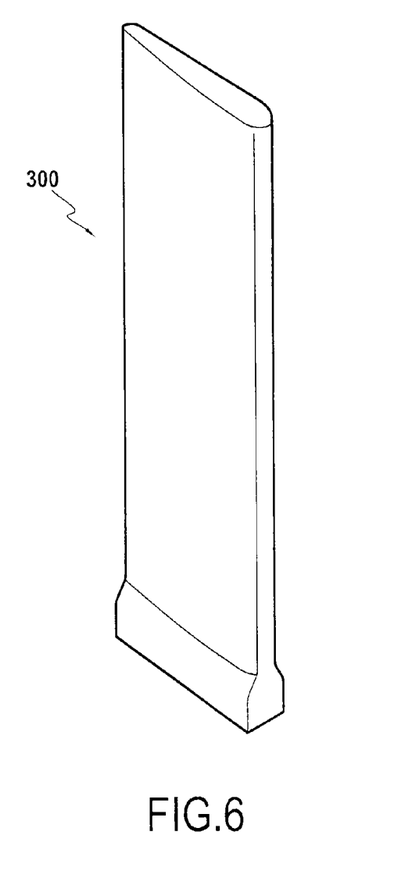
FIG. 6 is a diagrammatic perspective view of a blade fiber preform obtained from the FIG. 1 fiber structure.

Once the weaving of the fiber structure has been completed, the non-woven yarns are cut, and in particular those that have been extracted from the texture in the withdrawal parts in surface continuity and in surface discontinuity. This produces the fiber preform 300 shown in FIG. 6, which preform is woven as a single piece.

Figure 7:
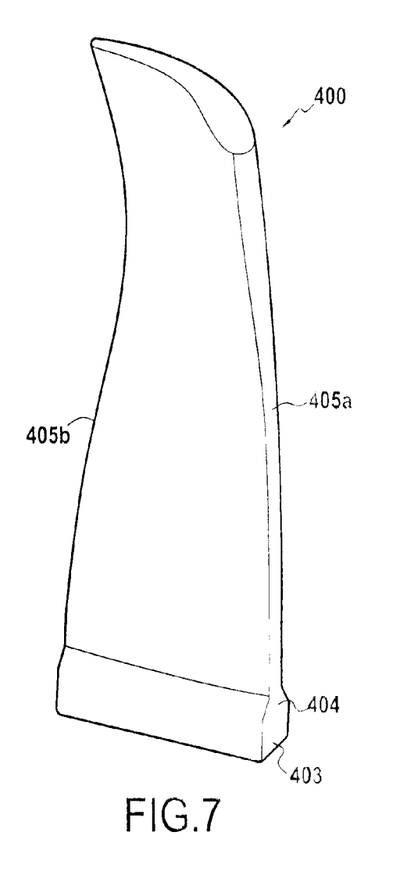
FIG. 7 is a diagrammatic perspective view of a composite material blade obtained by densifying the FIG. 6 preform with a matrix.

Thereafter the fiber preform 300 is densified in order to form a blade 10 of composite material as shown in FIG. 7. The fiber preform that is to constitute the fiber reinforcement of the part that is to be fabricated is densified by filling in the pores of the preform, throughout all or part of its volume, with the material that constitutes the matrix. This densification may be performed in known manner using a liquid technique or a gaseous technique (chemical vapor infiltration (CVI)), or indeed by using both of these techniques one after the other.

The liquid technique consists in impregnating the preform with a liquid composition containing a precursor for the material of the matrix. The precursor is generally in the form of a polymer, such as a high performance epoxy resin, possibly diluted in a solvent. The preform is placed in a mold suitable for being closed in leaktight manner with a recess that has the shape of the final molded blade. Thereafter, the mold is closed and the liquid precursor of the matrix (e.g. a resin) is injected into the entire recess so as to impregnate all of the fiber structure of the preform.

The precursor is transformed into the matrix, i.e. it is polymerized, by applying heat treatment, generally by heating the mold after eliminating any solvent and curing the polymer, with the preform continuing to be held in the mold that has a shape corresponding to the shape of the part that is to be made.

When forming a matrix of carbon or of ceramic, the heat treatment consists in pyrolyzing the precursor in order to transform the matrix into a carbon or ceramic matrix depending on the precursor used and on pyrolysis conditions. By way of example, liquid precursors for ceramic, in particular for SiC, may be resins of the polycarbosilane (PCS) type, or of the polytitanocarbosilane (PTCS) type, or of the polysilazane (PSZ) type, whereas liquid precursors of carbon may be resins having a relatively high coke content, such as phenolic resins. A plurality of consecutive cycles, each running from impregnation to heat treatment, may be performed in order to achieve a desired degree of densification.

According to an aspect of the invention, in particular when forming an organic matrix, the fiber preform may be densified by the well-known resin transform molding (RTM) method. In the RTM method, the fiber preform is placed in a mold presenting the outside shape of the part that is to be made. A thermosetting resin is injected into the inside volume of the mold that contains the fiber preform. A pressure gradient is generally established in said inside space between the location where the resin is injected and orifices for exhausting the resin in order to control and optimize the way the preform is impregnated by the resin.

In known manner, the fiber preform may also be densified using a gaseous technique of chemical vapor infiltration (CVI) of the matrix. The fiber preform corresponding to the fiber reinforcement of the blade that is to be made is placed in an oven into which a reaction gas is admitted. The pressure and the temperature that exist inside the oven and the composition of the gas are selected in such a manner as to enable the gas to diffuse within the pores of the preform so as to form the matrix therein by depositing a solid material in the core of the material in contact with the fibers, which solid material is the result of a component of the gas decomposing or of a reaction between a plurality of components, in contrast to the pressure and temperature conditions that are specific to chemical vapor deposition (CVD) methods that lead to deposition taking place solely on the surface of the material.

An SiC matrix may be formed using methyltrichlorosilane (MTS) that gives SiC by decomposition of the MTS, whereas a carbon matrix may be obtained using hydrocarbon gases such as methane and/or propane that produce carbon by cracking.

It is also possible to perform densification by combining the liquid technique and the gaseous technique so as to facilitate implementation, limit cost, and limit the number of fabrication cycles while still obtaining characteristics that are satisfactory for the intended utilization.

After densification, a composite material blade 400 is obtained, as shown in FIG. 7, that includes a root 403 in its bottom portion that is constituted by the extra thickness 203 of the fiber structure 200, which is extended by a tang 404 formed by the portion of decreasing thickness 204 of the structure 200, and by an airfoil 405 formed by the portion 205 of the fiber structure 200, and extending perpendicularly relative to the longitudinal direction of the blade between a leading edge 405a and a trailing edge 405b.

The invention claimed is:

1. A fiber structure for reinforcing a composite material part, the structure being woven as a single piece by multi-layer weaving between a first plurality of layers of yarns extending in a first direction and a second plurality of layers of yarns extending in a second direction,
   wherein at least one of the first and second pluralities of layers of yarns includes at least one layer of yarns of variable weight, each variable-weight yarn including a separable assembly of individual yarns each having a determined weight; and
   wherein the fiber structure includes at least one portion of reduced thickness in which the variable-weight yarns present weight that is less than the weight presented by the variable-weight yarns prior to the portion of reduced thickness.

2. A structure according to claim 1, wherein the weight of each individual yarn of a variable-weight yarn is a divisor of the weight of the variable-weight yarn.

3. A structure according to claim 1, wherein the variable-weight yarns are assembled yarns.

4. A structure according to claim 1, wherein each variable-weight yarn has an initial weight of 48K and includes one of the following separable assemblies of individual yarns:
   two individual yarns, each weighing 24K;
   three individual yarns including one weighing 24K and two others, each weighing 12K; and
   four yarns, each weighing 12K.

5. A structure according to claim 1, wherein, in the portion of reduced thickness, the fiber structure has three layers of the first plurality of layers of yarns and two layers of the second plurality of layers of yarns.

6. A structure according to claim 1, wherein the portion of reduced thickness includes at least one zone starting from which a layer of the first or second plurality of layers of yarns is interrupted, the interrupted layer of yarns being replaced thereafter in the portion of reduced thickness by individual yarns of a layer of variable-weight yarns adjacent to the interrupted layer.

7. A composite material part comprising fiber reinforcement densified by a resin matrix in which the fiber reinforcement is formed by a fiber structure according to claim 1 and densified by a matrix.

8. A part according to claim 7, constituting an aeroengine blade.

9. A part according to claim 8, wherein the reduced thickness portion of the fiber structure corresponds to a portion of the fiber reinforcement that forms a trailing edge of the blade.

10. A turboprop comprising a plurality of blades according to claim 9.

11. An aircraft comprising at least one turboprop according to claim 10.

12. A method of fabricating a fiber structure for reinforcing a composite material part, the method comprising:

weaving a fiber structure as a single piece by multilayer weaving between a first plurality of layers of yarns extending in a first direction and a second plurality of layers of yarns extending in a second direction, wherein at least one of the first and second pluralities of layers of yarns includes at least one layer of yarns of variable weight, each variable-weight yarn including a separable assembly of individual yarns each having a determined weight; and wherein the method further comprising reducing weight of variable-weight yarn during weaving of at least one portion of reduced thickness in the fiber structure.

13. A method according to claim 12, wherein, during weaving of the reduced thickness in the fiber structure, a layer of the first or second plurality of layers of yarns is interrupted, the interrupted layer of yarns being replaced thereafter in the portion of reduced thickness by individual yarns of a layer of variable weight yarns adjacent to the interrupted layer.

* * * * *